(12) United States Patent
Hakola et al.

(10) Patent No.: US 11,140,677 B2
(45) Date of Patent: Oct. 5, 2021

(54) GUARD PERIOD BETWEEN SUBFRAME PORTIONS OF SAME LINK DIRECTION IN WIRELESS NETWORKS

(71) Applicant: NOKIA SOLUTIONS AND NETWORKS OY, Espoo (FI)

(72) Inventors: Sami-Jukka Hakola, Kempele (FI); Esa Tapani Tiirola, Kempele (FI); Eeva Lahetkangas, Kiiminki (FI); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/070,470

(22) PCT Filed: Jan. 19, 2016

(86) PCT No.: PCT/EP2016/050947
§ 371 (c)(1),
(2) Date: Jul. 17, 2018

(87) PCT Pub. No.: WO2017/125129
PCT Pub. Date: Jul. 27, 2017

(65) Prior Publication Data
US 2019/0223175 A1 Jul. 18, 2019

(51) Int. Cl.
*H04W 72/04* (2009.01)
*H04L 27/26* (2006.01)
(Continued)

(52) U.S. Cl.
CPC ....... *H04W 72/0446* (2013.01); *H04L 5/0091* (2013.01); *H04L 27/2605* (2013.01); *H04W 72/14* (2013.01); *H04L 1/1607* (2013.01)

(58) Field of Classification Search
None
See application file for complete search history.

(56) References Cited

U.S. PATENT DOCUMENTS 9,532,369 B2 * 12/2016 Susitaival ............. H04L 5/1469
370/328
2003/0017853 A1 * 1/2003 Kanamaluru .......... H01Q 1/246
455/562.1
(Continued)

FOREIGN PATENT DOCUMENTS

JP 2014524217 A 9/2014
WO 2013141770 A1 9/2013
(Continued)

OTHER PUBLICATIONS

Lahetkangas et al.; "On the Flexible 5G Dense Deployment Air Interface for Mobile Broadband"; 2014 1st International Conference on 5G for Ubiquitous Connectivity (5GU), ICST, Nov. 26, 2014, pp. 57-61.
(Continued)

*Primary Examiner* — Anh Vu H Ly
(74) *Attorney, Agent, or Firm* — Brake Hughes Bellermann LLP

(57) ABSTRACT

A technique may include sending, by a base station to at least one user device, a signal indicating a configuration of at least one guard period, wherein the at least one guard period is provided between subframe portions of a same link direction. According to an example implementation, the at least one guard period may include one or more of: at least one first guard period provided between subframe portions of a same link direction within a subframe, and at least one second guard period provided between subframe portions of a same link direction of different subframes.

22 Claims, 16 Drawing Sheets

(51) Int. Cl.
*H04L 5/00* (2006.01)
*H04W 72/14* (2009.01)
*H04L 1/16* (2006.01)

(56) References Cited

U.S. PATENT DOCUMENTS

| | | | |
|---|---|---|---|
| 2012/0069793 | A1 | 3/2012 | Chung et al. |
| 2013/0235851 | A1* | 9/2013 | Abu-Surra ........... H04J 11/0069 370/336 |
| 2013/0279356 | A1* | 10/2013 | Park ..................... H04B 7/0695 370/252 |
| 2014/0307654 | A1 | 10/2014 | Kim |
| 2015/0009951 | A1 | 1/2015 | Josiam et al. |
| 2015/0146647 | A1* | 5/2015 | Chatterjee ........... H04L 27/2607 370/329 |
| 2015/0327196 | A1 | 11/2015 | Blankenship et al. |
| 2016/0219583 | A1* | 7/2016 | Blankenship ..... H04W 72/1205 370/328 |
| 2016/0254901 | A1* | 9/2016 | You ...................... H04W 76/28 370/281 |
| 2016/0270070 | A1* | 9/2016 | Mukkavilli ........... H04L 5/1469 |
| 2017/0041119 | A1* | 2/2017 | Ang ..................... H04L 5/1469 |
| 2017/0111152 | A1* | 4/2017 | Blankenship ........ H04L 5/0051 |
| 2017/0111160 | A1* | 4/2017 | Chen ........................ H04L 5/14 |
| 2017/0170944 | A1* | 6/2017 | Ang ........................ H04L 1/1812 |
| 2017/0310435 | A1* | 10/2017 | Wei ....................... H04W 16/06 |
| 2017/0325227 | A1* | 11/2017 | Li ......................... H04L 5/0044 |
| 2018/0249374 | A1* | 8/2018 | Park ..................... H04W 48/14 |
| 2018/0310283 | A1* | 10/2018 | Deenoo ............... H04W 72/042 |
| 2018/0359790 | A1* | 12/2018 | Ingale ................... H04W 28/16 |
| 2019/0058572 | A1* | 2/2019 | Lee ......................... H04L 1/18 |

FOREIGN PATENT DOCUMENTS

| | | |
|---|---|---|
| WO | 2014074055 A2 | 5/2014 |
| WO | 2014133311 A1 | 9/2014 |

OTHER PUBLICATIONS

International Search Report and Written Opinion for International Application No. PCT/EP2016/050947, dated Sep. 22, 2016 (10 pages).
3GPP RAN Workshop on 5G, RWS-150076, Report of 3GPP RAN Workshop on "5G", Phoenix, Arizona, Sep. 17-18, 2015 (40 pages).
"What is special sub frame in LTE", http://www.telecomsource.net/, Jul. 9, 2012 (4 pages).
Office Action for Japanese Application No. 2018-537848, dated Aug. 5, 2019, 2 pages.
Office Action for Japanese Application No. 2018-537848, dated Dec. 9, 2019, 3 pages.
Office Action for Japanese Application No. 2018-537848, dated Jun. 8, 2020, 4 pages.
Office Action for European Application No. 16701736.7, dated May 25, 2020, 5 pages.
First Examination Report for Indian Patent Application No. 201817024060, dated Jun. 3, 2020, 6 pages.

* cited by examiner

GUARD PERIOD BETWEEN SUBFRAME PORTIONS OF SAME LINK DIRECTION IN WIRELESS NETWORKS

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, above 6 GHz. For fifth generation wireless systems (5G), an access architecture for deployment of cellular radio equipment employing mmWave radio spectrum has been proposed. Other example spectrums may also be used, such as cmWave radio spectrum (3-30 GHz).

Any increased attenuation at higher carrier frequencies may, for example, be compensated by introducing multi-element antenna arrays and correspondingly antenna gain via beamforming at the access point (AP)/base station (BS) and/or user device. However, time is required for a device to perform beam switching to switch from one beam to another beam.

SUMMARY

According to an example implementation, a method may include sending, by a base station to at least one user device, a signal indicating a configuration of at least one guard period, wherein the at least one guard period is provided between subframe portions of a same link direction.

According to another example implementation, an apparatus may include at least one processor and at least one memory including computer instructions, when executed by the at least one processor, cause the apparatus to send, by a base station to at least one user device, a signal indicating a configuration of at least one guard period, wherein the at least one guard period is provided between subframe portions of a same link direction.

According to another example implementation, a computer program product may include a computer-readable storage medium and storing executable code that, when executed by at least one data processing apparatus, is configured to cause the at least one data processing apparatus to send, by a base station to at least one user device, a signal indicating a configuration of at least one guard period, wherein the at least one guard period is provided between subframe portions of a same link direction.

According to another example implementation, an apparatus may include means for sending, by a base station to at least one user device, a signal indicating a configuration of at least one guard period, wherein the at least one guard period is provided between subframe portions of a same link direction; and means for sending, by the base station to at least one user device, signaling indicating whether or not the at least one guard period will be provided for one or more specific subframes.

According to an example implementation, a method may include receiving, by a user device from a base station, a signal indicating a configuration of at least one guard period, wherein the at least one guard period is provided between subframe portions of a same link direction.

According to another example implementation, an apparatus may include at least one processor and at least one memory including computer instructions, when executed by the at least one processor, cause the apparatus to: receive, by a user device from a base station, a signal indicating a configuration of at least one guard period, wherein the at least one guard period is provided between subframe portions of a same link direction.

According to another example implementation, a computer program product may include a computer-readable storage medium and storing executable code that, when executed by at least one data processing apparatus, is configured to cause the at least one data processing apparatus to receive, by a user device from a base station, a signal indicating a configuration of at least one guard period, wherein the at least one guard period is provided between subframe portions of a same link direction.

According to another example implementation, an apparatus may include means for receiving, by a user device from a base station, a signal indicating a configuration of at least one guard period, wherein the at least one guard period is provided between subframe portions of a same link direction; and means for receiving, by the user device from the base station, signaling indicating whether or not the at least one guard period will be provided for one or more specific subframes.

The details of one or more examples of implementations are set forth in the accompanying drawings and the description below. Other features will be apparent from the description and drawings, and from the claims.

DETAILED DESCRIPTION

Figure 1:
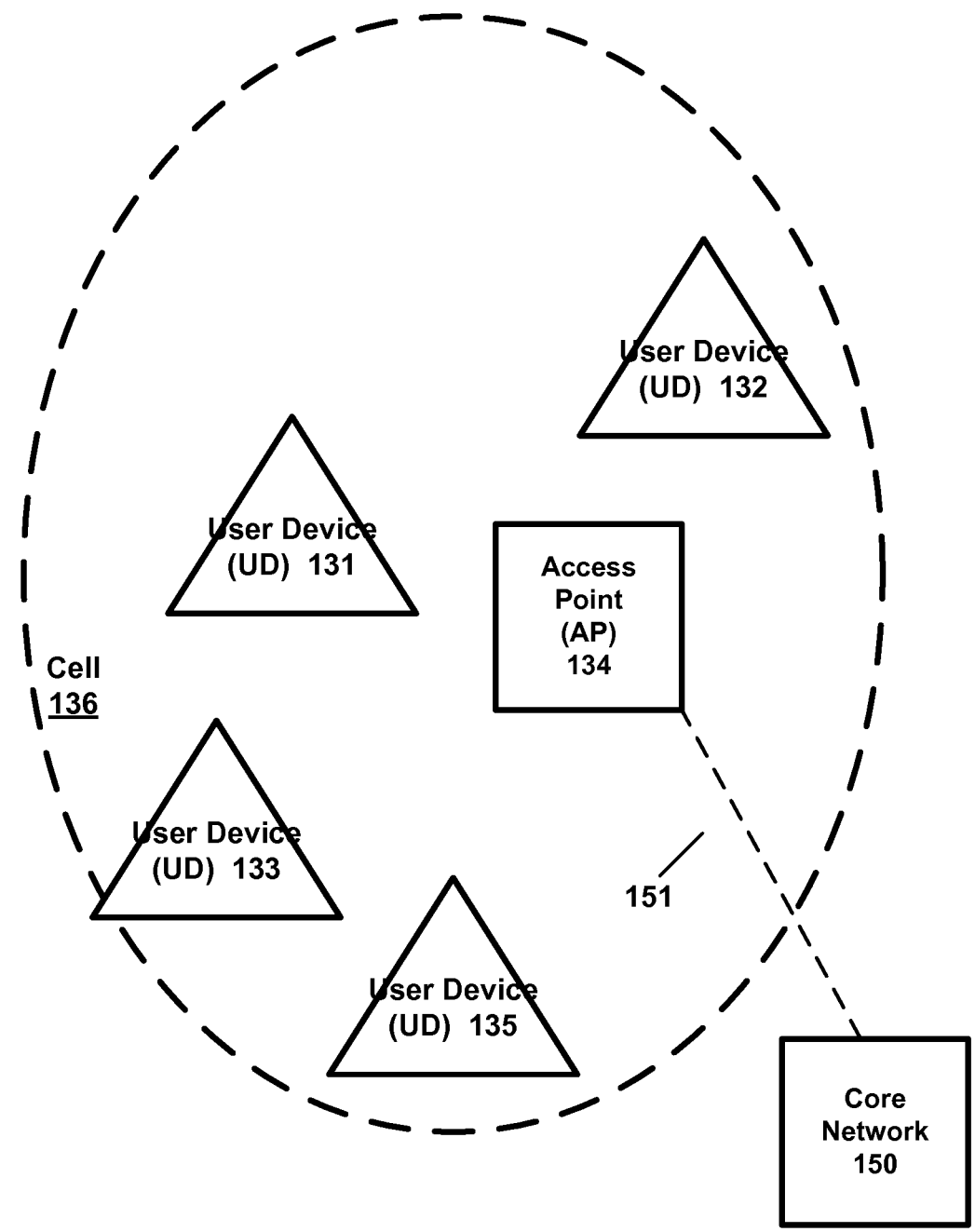
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with an access point (AP), which may also be referred to as a base station (BS) or an enhanced Node B (eNB). At least part of the functionalities of an access point (AP), base station (BS) or (e)Node B (eNB) may be also be carried out by any node, server or host which may be operably coupled to a transceiver, such as a remote radio head. AP 134 provides wireless coverage within a cell 136, including to user devices 131, 132, 133 and 135. Although only four user devices are shown as being connected or attached to AP 134, any number of user devices may be provided. AP 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, cmWave, and/or mmWave band networks, or any other wireless network. LTE, 5G, cmWave and mmWave band networks are provided only as illustrative examples, and the various example implementations may be applied to any wireless technology/wireless network.

Figure 2:
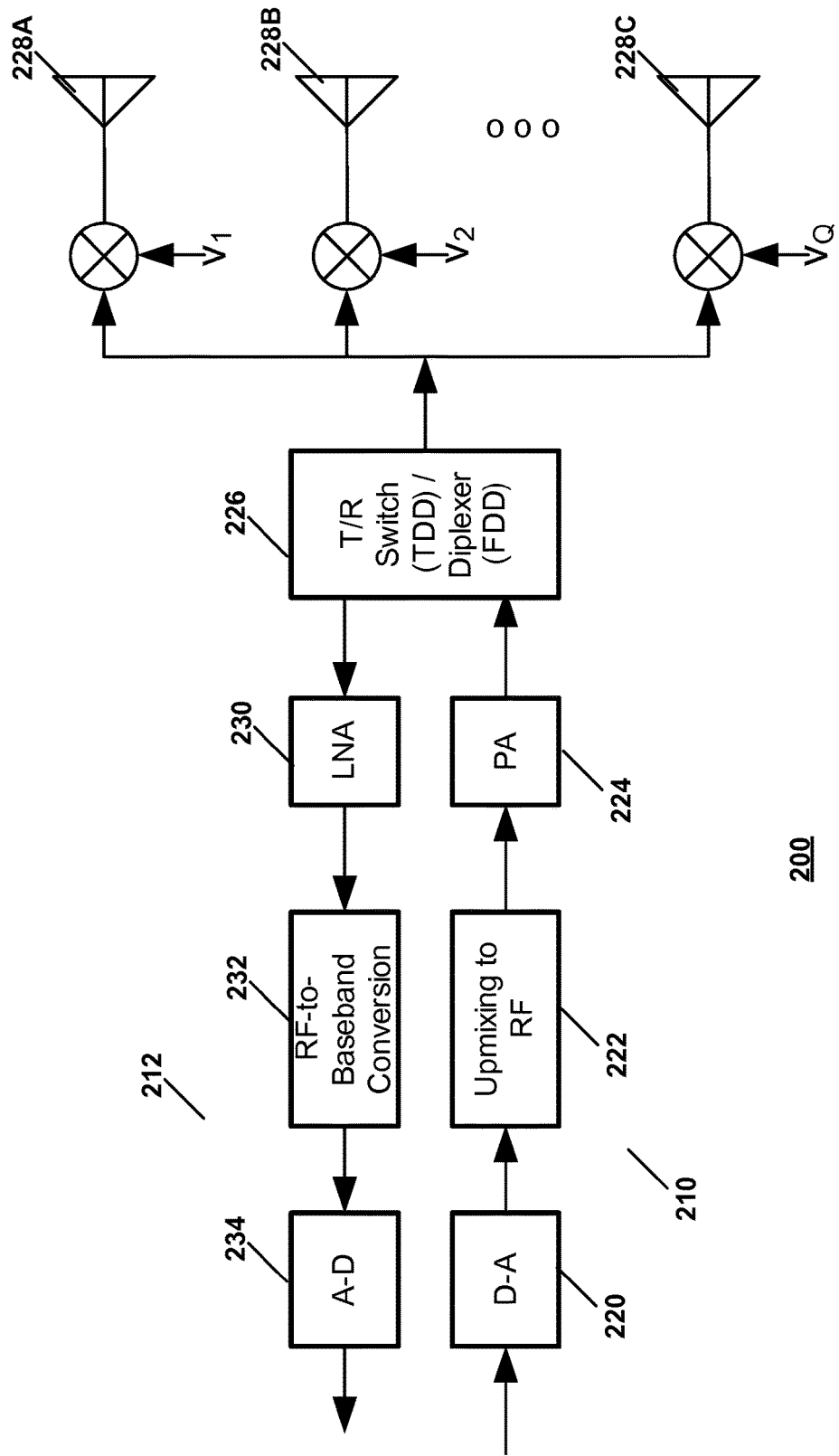
FIG. 2 is a diagram of a wireless transceiver according to an example implementation.

FIG. 2 is a diagram of a wireless transceiver according to an example implementation. Wireless transceiver 200 may be used, for example, at a base station (BS), e.g., Access Point (AP) or eNB, or other wireless device. Wireless transceiver 200 may include a transmit path 210 and a receive path 212.

In transmit path 210, a digital-to-analog converter (D-A) 220 may receive a digital signal from one or more applications and convert the digital signal to an analog signal. Upmixing block 222 may up-convert the analog signal to an RF (e.g., radio frequency) signal. Power amplifier (PA) 224 then amplifies the up-converted signal. The amplified signal is then passed through a transmit/receive (T/R) switch (or Diplexer 226 for frequency division duplexing, to change frequencies for transmitting). The signal output from T/R switch 226 is then output to one or more antennas in an array of antennas 228, such as to antenna 228A, 228B and/or 228C. Prior to being transmitted by one or more of the antennas in the array of antennas 228, a set of beam weights $V_1, V_2, \ldots$ or $V_Q$ is mixed with the signal to apply a gain and phase to the signal for transmission. For example, a gain and phase, $V_1, V_2, \ldots$ or $V_Q$, may be applied to the signal output from the T/R switch 226 to scale the signal transmitted by each antenna (e.g., the signal is multiplied by $V_1$ before being transmitted by antenna 1 228A, the signal is multiplied by $V_2$ before being transmitted by antenna 2 228B, and so on), where the phase may be used to steer or point a beam transmitted by the overall antenna array, e.g., for directional beam steering. Thus, the beam weights $V_1$, $V_2, \ldots$ or $V_Q$ (e.g., each beam weight including a gain and/or phase) may be a set of transmit beamforming beam weights when applied at or during transmission of a signal to transmit the signal on a specific beam, and may be a set of receive beamforming beam weights when applied to receive a signal on a specific beam.

In receive path 212 of wireless transceiver 200, a signal is received via an array of antennas 228, and is input to T/R switch 226, and then to low noise amplifier (LNA) 230 to amplify the received signal. The amplified signal output by LNA 230 is then input to a RF-to-baseband conversion block 232 where the amplified RF signal is down-converted to baseband. An analog-to-digital (A-D) converter 234 then converts the analog baseband signal output by conversion block 232 to a digital signal for processing by one or more upper layers/application layers.

Various example implementations may relate, for example, to 5G radio access systems (or other systems) with support for Massive MIMO (multiple input, multiple output) and optimized for operating in high carrier frequencies such as cmWave frequencies (e.g. from 3 GHz onwards) or mmWave frequencies, as examples, according to an illustrative example implementation. Those illustrative systems are typically characterized by the need for high antenna gain to compensate for increased pathloss and by the need for high capacity and high spectral efficiency to respond to ever increasing wireless traffic. According to an example implementation, the increased attenuation at higher carrier frequencies may, for example, be compensated by introducing massive (multi-element) antenna arrays and correspondingly antenna gain via beamforming at the access point (AP)/base station (BS). The spectral efficiency may typically improve with the number spatial streams the system can support and thus with the number of antenna ports at the AP/BS.

Figure 3:
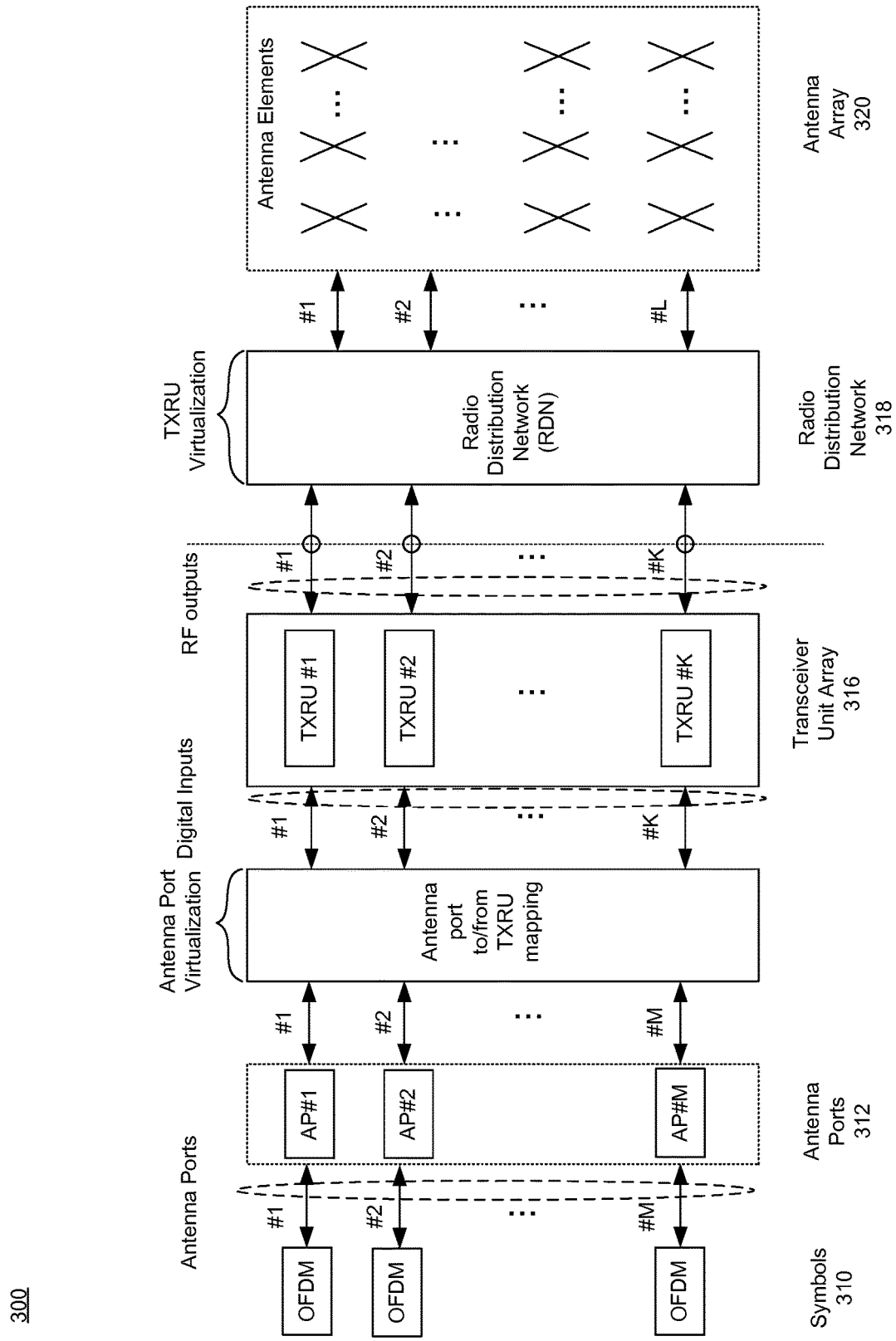
FIG. 3 is a diagram illustrating a radio system architecture according to an illustrative example implementation.

FIG. 3 is a diagram illustrating a radio system architecture according to an illustrative example implementation. Both transmit and receive directions are shown. In the transmit direction, radio system architecture 300 receives/generates multiple symbols (e.g., OFDM/orthogonal frequency division multiplex symbols) 310 which are mapped/provided to M antenna ports 312. Antenna ports 312 in this illustrative example does not refer to physical antenna ports. Rather, antenna ports 312, e.g., as defined by LTE as an illustrative example, refer to logical antenna ports (logical entities), which may be distinguished by their reference signal sequence. Multiple (logical) antenna port signals can be transmitted over a single antenna/single antenna array, for example. A transceiver unit array 316 includes K transceiver (wireless/radio transmitter/receiver) units (TXRUs). Antenna port virtualization block 314 performs mapping between M antenna ports and K digital inputs of transceiver unit array 316 (e.g., performs mapping between M antenna ports and K TXRUs). On the RF side of transceiver unit array 316, a radio distribution network 318 performs TXRU virtualization, e.g., by mapping or connecting each TXRU to one or more antenna elements of antenna array 320. One TXRU can be connected to {1 . . . L} antenna elements depending on the TXRU virtualization, i.e., mapping between TXRUs and Antenna Elements. Mapping can be either sub-array or full connection. In the sub-array model, one TXRU is connected to subset of antenna elements where different subsets may be disjoint while in the full connection model each TXRU is connected to each antenna element or all antenna elements of the antenna array 320. Radio distribution network (RDN) 318 performs antenna virtualization in the RF domain.

In the transmitting direction, M antenna ports feed K TXRUs, and K TXRUs feed L antenna elements where M<K<L, in this illustrative example implementation.

Complexity and power consumption of baseband processing may typically limit the number of antenna ports M to be much less than L in the cmWave system (as an illustrative example) where L can be from tens up to hundreds, for example. In an illustrative example implementation, power consumption of TXRUs (excluding power amplifier) is mainly due to DACs (digital to analog converter(s)) of which power consumption may typically be approximately linearly proportional to bandwidth and exponentially proportional to the number of ADC (analog to digital converter) bits ($P \sim B \times 2^{2R}$; where B is bandwidth and R is bits per sample). As an example, typically 16 bit ADCs are used, e.g. in LTE. Thus, the power consumption of a TXRU may limit the feasible number of TXRUs being less than L. For example, in LTE, the number of TXRUs (i.e., K) defines the maximum number of antenna ports identified by CSI-RSs (Channel State Information Reference Signals) that can be defined and measured by the UE.

Different types of Adaptive Antenna Systems (AAS) or beamforming systems may be used, such as digital AAS, hybrid AAS and analog AAS, which some example implementations of these AAS systems may be summarized as follows, for example:

Digital AAS: one or more spatial layers per user device; digital precoding only; K=L (M<=K).

Analog AAS: one spatial layers per user device; no digital precoding, analog beamforming only; K<L (M=1); one-to-many mapping from TXRU to antenna elements.

Hybrid AAS: one or more spatial layers per user device; involves both analog and digital beamforming only (and digital precoding); K<L (M<=K); one-to-many mapping from TXRU to antenna elements.

Typically cellular systems, such as LTE, rely on sector wide beams for common control plane transmissions like downlink synchronization, broadcast, antenna port based common reference signals, etc. However, some systems, such as, for example, the systems operating on higher carrier frequencies may require relatively high antenna gain which means operating with narrow(er) beams. To support cell sizes with inter-site distance of, for example, tens to hundreds meters (merely an illustrative example), e.g., for common control plane signaling may need to utilize beams narrower than sector. To provide coverage for the angular domain of the sector with narrow beams, multiple data self-containing beams may be generated.

According to an example implementation, an AP with a digital architecture may be able to apply multiple beams at a time, or even all beams at one time. Thus, in such case, when transmitting or receiving with different user devices, less beam switching may be required for digital architecture. However, depending on the architecture and access point (AP) capabilities, the AP may not have hardware resources (i.e., TXRUs) or transmission power for generating so many beams in parallel that the whole sector could be covered at once. Rather, operating an example hybrid architecture AP may require sequential transmission of narrow beam(s) in different areas/portions of cell, e.g., for common control plane signaling or other signals in beam domain or other signals. Correspondingly in uplink, an APBS with hybrid architecture is capable of receiving only signals from directions the current RF beam(s) are pointing to, which may be only one or a few narrow beams at time, according to an example implementation. Similarly in downlink the AP may transmit signals only to user devices to which a beam (e.g., or set of narrow beams) has been directed or pointed to by the AP. Thus, with the use of narrow beams, the APBS may, at least in some cases (e.g., such as for a hybrid architecture AP), be required to perform beam switching (e.g., switch beams) when transmitting to or receiving from different user devices (because a different beam may be required to communicate with user devices that are in different locations). However, time is required to perform beam switching, as beam switching may require, e.g., applying a different set of beam weights to a TXRU and then generating the new beam(s) for transmitting or receiving signals based on such beam weights.

Therefore, according to an example implementation, one or more guard periods (GPs) may be provided between subframe portions of a same link direction to allow an AP or user device time to perform beam switching. According to an illustrative example implementation, one or more (or even all) of three different types of guard periods (GPs) may be provided as part of a subframe configuration or a guard period configuration, including, for example: 1) a guard period 1 (GP1) may be provided between an uplink portion of a subframe and a downlink portion of a subframe, e.g., to allow the wireless TXRU to switch between transmitting and receiving, and to accommodate the propagation delay between a transmitting wireless device and a receiving wireless device (GP1 may also provide sufficient time to allow wireless devices (e.g., APs, user devices) to perform beam switching as well); 2) a guard period 2 (GP2) may be provided between subframe portions of a same link direction within a subframe, e.g., to allow an AP and a user device(s) to perform beam switching between these subframe portions; and 3) a guard period 3 (GP3) provided between subframe portions of a same link direction of different subframes, e.g., to allow an AP or user device(s) to perform beam switching between such subframe portions.

According to an example implementation, a link direction may refer to either an uplink transmission (uplink direction from a user device to an AP), or a downlink direction (a downlink direction from an AP to a user device). Therefore, subframe portions of a same link direction may include subframe portions that are both uplink subframe portions (portions of a subframe for transmission of uplink signals or data), or subframe portions that are both downlink subframe portions (portions of a subframe for transmission of downlink signals or data). The subframe portions may include data portions of a subframe for the transmission of data, and control portions of a subframe for the transmission of control signals or signaling.

Thus, according to an example implementation, support for RF beam switching is provided. A configurable grid of guard periods may be provided for different subframe types.

A GP1 (guard period 1 or first guard period may be provided between subframe portions of a different link direction (e.g., a GP1 provided between an uplink subframe portion and a downlink subframe portion), e.g., to allow devices time to switch from transmit to receive or receive to transmit, and to accommodate the propagation delay or latency between two wireless devices. GP1, provided between subframe portions of a different link direction, may also be sufficient to allow wireless devices (e.g., AP and/or user device) to perform beam switching during GP1).

A GP2 (guard period 2, or second guard period) may be scheduled or reserved between subframe portions of a same link direction, such as a GP2 between a control portion and a data portion of the same link direction within a subframe.

Additionally, according to an example implementation, if there is no GP at the end of a subframe (e.g., due to link direction switching/switching opportunity), there may be a need for providing a GP3 (a guard period 3 or third guard period), which may be functionally similar to GP2, but may be provided between subframe portions of a same link direction of different subframes. By providing GP3 between subframe portions of a same link direction of different subframes, the GP3 may be provided, for example, either at the end of a first subframe, or at the beginning of a second subframe, for example. In this manner, one or more guard periods may be provided to facilitate (or allow) RF (radio frequency) beam switching.

According to an example implementation, there are several options that may be used to enable guard periods GP2 and/or GP3. GP2 could be part of the guard period (GP) which may effectively diminish GP1. This is applicable to special downlink subframes (S-DL) and/or special uplink subframes (S-UL), for example. For example, GP1 may be reduced, and one or more symbols or resources from GP1 may be used to provide GP2 and/or GP3, for example.

According to an example implementation, one or more symbols of GP2 and/or GP3 may be provided or obtained by an APBS, to allow RF beam switching, by the APBS performing one or more of the following, by way of illustrative example: puncturing one or more data symbols of a subframe; puncturing one or more symbols of a cyclic prefix of a subframe; shortening a guard period (e.g., GP1) provided between subframe portions of a different link direction; and/or increasing one or more symbols of a zero tail of a subframe (e.g., where the zero values of the zero tail may be used as a guard period, GP2 and/or GP3, for beam switching, for example).

GP2 and/or GP3 may also be enabled also by using fractional symbol for one or more symbols within a subframe, e.g., symbols with length ½ or ¼ of regular symbol size, with a remaining portion of the symbol(s) being used for guard period, e.g., GP2 and/or GP3, for example. According to an illustrative example, when a FFT (Fast Fourier Transform) size of 2048 is use for generating regular symbols, fractional symbol can be made using FFT size of 1024 or 512 (up-to three symbols with FFT size 512). The remaining time is then available (e.g., as a GP2 or GP3) for RF beam switching, for example.

Also, according to an example implementation, when an APBS configures user devices/UEs with a guard period configuration (which may also be referred to as a subframe configuration) that includes GP2 and/or GP3, all user devices/UEs may then follow that configuration, e.g., unless a subsequent instruction or control signal is sent by the APBS (and received by user devices) indicating that GP2 and/or GP3 will not be provided for one or more specific subframes, for example. In such case, no GP2 and/or GP3 would be provided for such subframe(s), as indicated by the subsequent instruction or control signal from the APBS. In an embodiment, signaling indicating that GP2 and/or GP3 will be provided may be cell-specific signaling, such as common control signaling. In an embodiment, signaling indicating that GP2 and/or GP3 will not be provided (or will be provided) may be user device—specific signaling, such as UE-specific control signaling.

Therefore, according to one or more example implementations, GP2 may be included in all subframes or in predetermined subframes only. The presence of GP2 and/or GP3 may depend also on the presence of certain signal types in the subframe (e.g., control signals, or reference signals). The presence of GP2 and/or GP3 may dynamically vary according to APBS scheduling decisions related to control, data and RS (reference signals). In an example implementation, GP2 and/or GP3 may be present only if the RF beam changes within the subframe for GP2 (or between subframes in the case of GP3) are performed by the APBS and/or user device. This may vary from subframe to subframe and RF-beam to RF-beam. The presence of GP2 and/or GP3 may be indicated in the downlink control information (DCI). DCI may also adjust a length of DL (downlink) or UL (uplink) data portions in the involved subframe(s).

In addition, according to an example implementation, a GP2 and/or GP3 guard period(s) may be used/selected, for example, when a hybrid system/architecture is used, as an illustrative example, and/or when the APBS (and/or user device/UE) is required to perform beam switching between subframe portions of a same link direction. Rationale for sharing resources or symbols of GP1 with (or to create) GP2 and/or GP3 in certain cases may include, for example, that hybrid systems/architectures at higher carrier frequencies may typically be based on distributed PA (power amplifier) architectures with relatively low power PAs of which on-off and off-on transition times are short compared to high power PAs typically used in lower carrier frequency full digital systems.

In another example implementation, a two-stage signaling procedure for applying additional grid of guard periods may be used, including: In a first stage, cell specific signaling of the cell specific grid of guard periods (GP2 and GP3) may be signaled, e.g., to indicate that GP2 and/or GP3 will be used or provided. In an embodiment, the first stage signaling may be a one bit indication indicating that GP2 and GP3 are (or are not) configured to the cell. This guard period configuration (or subframe configuration) information may be signaled as part of downlink common control signaling and/or downlink control information (DCI). As an example, a discovery signal block (DSB) which may be transmitted periodically providing signals for user devices/UEs to detect and access the cell may include information about the applied cell specific grid of guard periods, e.g., whether or not GP2 and/or GP3 will be provided, and for which subframes, for example. According to an example implementation, once the APBS has signaled use of GP2 and/or GP3, the user devices/UEs may always apply GP2 and/or GP3 (e.g., both GP2 and GP3, or one of them, as signaled) unless otherwise signaled via dedicated control channel to the user device/UE.

In a second stage, user device/UE specific control channel signaling may be sent by the APBS to user devices/UEs that may override guard period (e.g., GP2 and GP3) configuration for the given or indicated subframe(s), for example. Thus, this may allow an APBS to use a first control signal turn on the use of GP2/GP3 for all (or a group of) subframes and/or for all or a group of UEs, and then later, send a second control signal to selectively turn off or disable to the use of GP2/GP3 selectively for one or more subframes and/or for one or more user devices/UEs, for example. The APBS may, for example, signal as part of DL or UL grant signaling to the user device/UE, that no GP2 and/or GP3 are to be applied for receiving DL data or transmitting UL data on granted subframe(s) (on subframes where DL or UL grant was applied). This enables reducing overhead in case the APBS doesn't need to switch RF beam(s) for the transceiver units allocated for transmitting data to user device/UE or receiving data from the user device/UE on certain subframe(s). That may be case when specific transceiver unit(s) allocated for the user device/UE is/are using the same RF beam for preceding transmission or reception at the APBS, or a beam is not used at all for preceding transmission or reception and RF beam switching (applying the correct beam) at APBS can be done before data symbols start. Further illustrative example implementations and example details are described in greater detail below.

In some embodiments, there is no first stage of signaling (or the first stage signaling indicates the GP2 and GP3 are not configured in the cell), and the second stage of signaling indicates selectively to certain UE(s) that the GP2 and/or GP3 needs to be (or will be) applied in some subframe(s).

Figure 4:
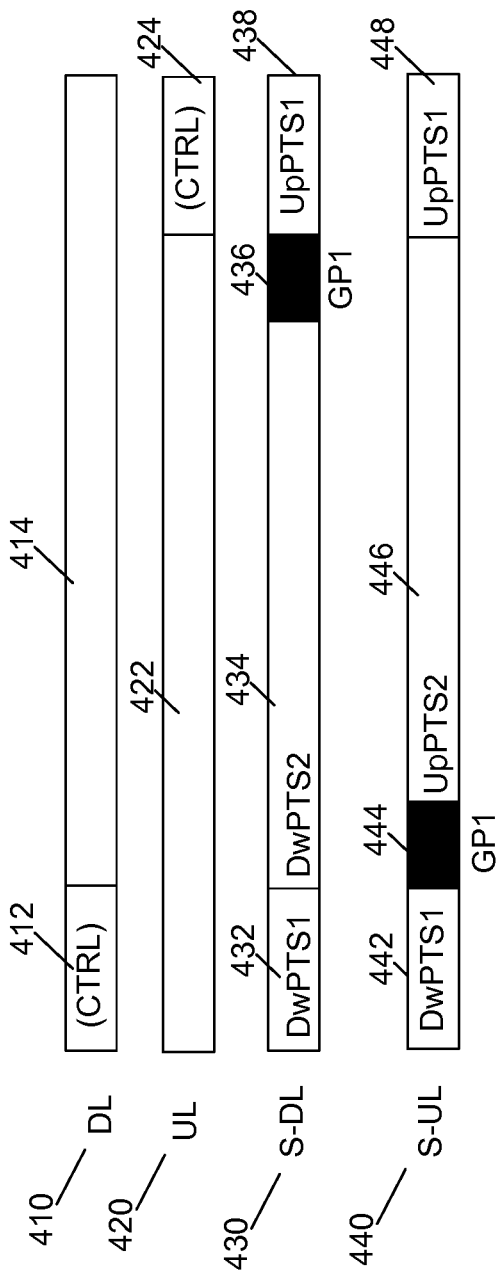
FIG. 4 is a diagram illustrating some illustrative subframe formats according to an example implementation.

FIG. 4 is a diagram illustrating some illustrative subframe formats according to an example implementation. To support a wide range of deployment scenarios, for example, different subframe structures/formats may be used. A guard period GP1 may be used for DL/UL and UL/DL switching time and may allow use of latency optimized subframe structures with bi-directional control. On the other hand, overhead from direction switching may allow or encourage use of downlink only and uplink only subframes that may be even concatenated together, e.g., to increase throughput and decrease overhead in some cases. Downlink only subframes may have a control block in the beginning of the subframe. It may also be omitted from certain subframes (e.g., when concatenating multiple DL only subframes). Special Downlink (S-DL) subframes may include two downlink parts DwPTS1 (which may be referred to as a downlink pilot timeslot 1) as a downlink control portion, and DwPTS2 as a data portion of a subframe. For example, DwPTS1 (downlink control portion of a subframe) may, for example, be allocated for downlink control symbols while DwPTS2 (downlink data portion of subframe) may be allocated for downlink data symbols. Similarly for S-UL, UpPTS1 (uplink control portion of subframe) may be provided for uplink control symbols and UpPTS2 (uplink data portion of subframe) may be allocated for uplink data symbols. GP1 stands for guard period 1 provided for link direction switch between UL and DL subframe portions, which may also be used for RF beam switching, as necessary.

Several example subframe formats are shown in FIG. 4, by way of illustrative example. A downlink only subframe 410 may include a downlink control portion 412 and a downlink data portion 414. An uplink only subframe 420 may include an uplink data portion 422 and an uplink control portion 424. A special downlink subframe 430 may include a downlink control portion 432, a downlink data portion 434, a GP1 436, and then an uplink control portion 438. Thus, in subframe 430, GP1 436 is provided between downlink data portion 434 and uplink control portion 438, as an illustrative example. Special uplink subframe 440 may include a downlink control portion 442, a GP1 444, an uplink data portion 446, and an uplink control portion 448. GP1 444 is provided between downlink control portion 442 and uplink data portion 446.

However, situations may arise where an APBS may need to perform RF beam switching between subframe portions of a same link direction. For example, in one or more subframes shown in FIG. 4, adjacent subframe portions may be transmitted by an APBS to different user devices/UEs, for example, and/or adjacent subframe portions may be received by an APBS from different user devices/UEs. For example, in special downlink subframe 430, downlink control portion 432 may include an uplink grant to user device 1 (where UL grant is for a next subframe or a later one). Thus, for example, downlink control portion 432 may be sent by an APBS to user device 1 via beam A (e.g., providing an uplink grant to user device 1 for a future subframe). Also, the APBS may also send downlink data portion 434 to user device 2 via beam B (which is a different beam from beam A). Thus, in this example, the APBS will need to perform RF beam switching between downlink control portion 432 (AP applying beam A to transmit to user device 1) and downlink data portion 434 (AP applying beam B to transmit to user device 2). Note that downlink control portion 432 and downlink data portion 434 are for the same link direction (downlink).

Similarly, situations may arise where a user device/UE may need to perform beam switching between subframe portions of a same link direction. In the subframe 430, a user device/UE may receive control information of downlink control portion 432 via beam A from a first remote radio head (RRH, which may be, for example, a spatially separated antenna unit of a base station, a wireless device or UE operating as a BS/AP within a network or cell), and then the user device/UE may receive data of downlink data portion 434 from a second remote radio head (RRH) via beam B. Thus, while the APBS (and a user device/UE) may need to perform RF beam switching in this example with respect to subframe 430 between downlink portions 432 and 434, a guard period is not shown in subframe configuration for subframe 430 to accommodate such RF beam switching, e.g., from beam A to beam B, for example.

Similarly, the need for a guard period between uplink subframe portions may also occur in some situations. For example, referring to subframe 440, an APBS may receive data in uplink data portion 446 via beam A (AP receive beam A) from user device 1, and the APBS may receive control signals in uplink control portion 448 from user device 2 via beam B (AP receive beam B, which is different than beam A). For example, the control signals received from user device 2 in uplink control portion 448 via beam B may include Acknowledgement/Negative Acknowledgement (ACK/NAK) data from user device 2 based on data sent by the APBS to user device 2 in a previous subframe, for example. Thus, in this illustrative example, the APBS will need to perform beam switching, e.g., to switch from beam A to beam B between uplink data portion 446 and uplink control portion 448. In a similar manner, an APBS and/or a user device may need to perform beam switching between subframe portions of a same link direction of different subframes. These are only a few examples of where there may be a need to perform RF beam switching between subframe portions of a same link direction, and other situations or examples may also be used or provided.

Figure 5:
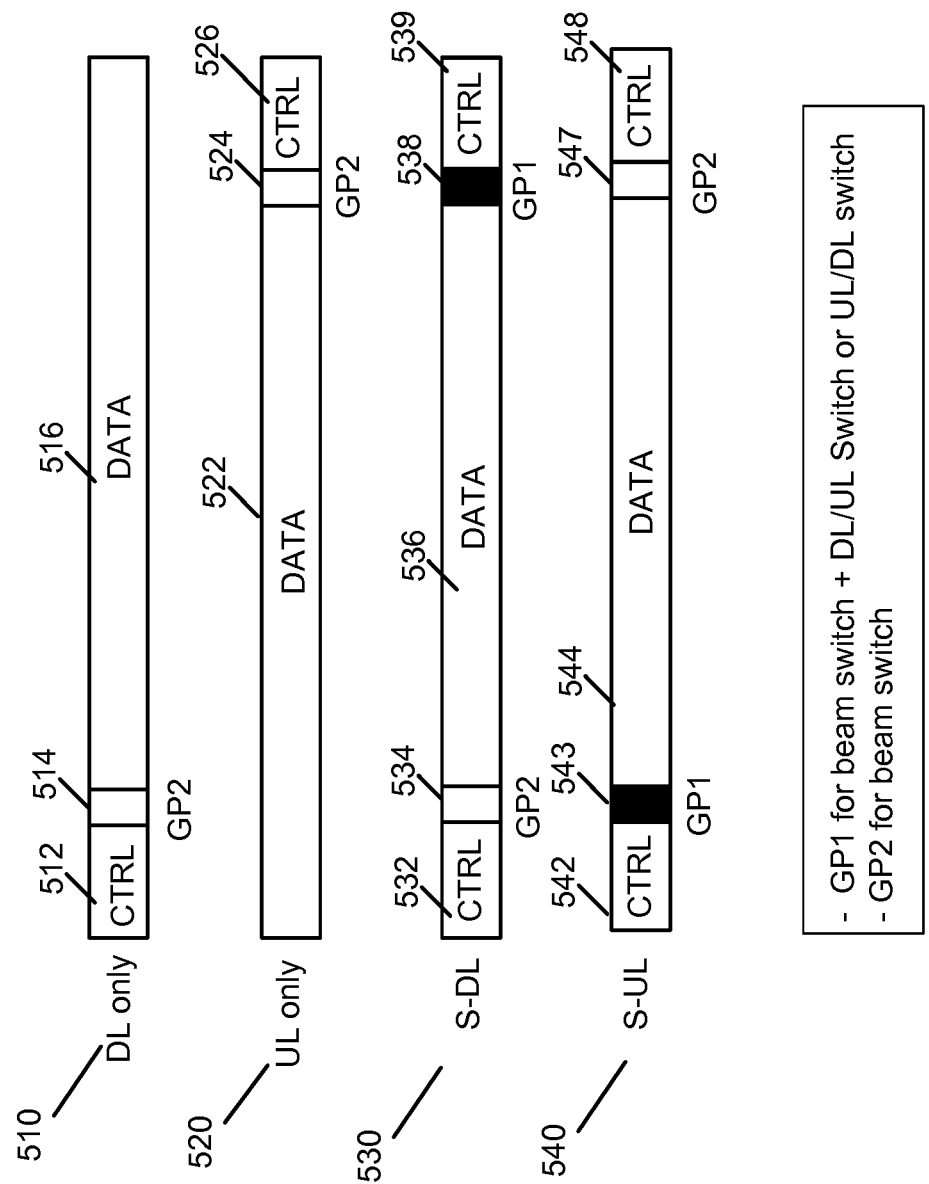
FIG. 5 is a diagram illustrating subframe formats in which a guard period 2 (GP2) is provided between subframe portions of a same link direction within a subframe according to an example implementation.

FIG. 5 is a diagram illustrating subframe formats in which a guard period 2 (GP2) is provided between subframe portions of a same link direction within a subframe according to an example implementation. Referring to FIG. 5, in a downlink only subframe 510, a GP2 514 is provided between downlink control portion 512 and downlink data portion 516, e.g., to allow the APBS and/or a user device to perform beam switching between subframe portions 512 and 516. This may allow, for example, an APBS to send control signals in downlink control portion 512 via AP transmit beam A, and then to switch to AP transmit beam B during GP2 514, and then transmit data via transmit beam B during data portion 516.

The other subframes illustrated in FIG. 5 may similarly include a GP2 between subframe portions of a same link direction within a subframe, to allow RF beam switching during GP2. For uplink only subframe 520, a GP2 524 is provided between uplink data portion 522 and uplink control portion 526. For special downlink subframe 530, a GP2 534 is provided between downlink control portion 532 and downlink data portion 536, while a GP1 538 is provided between downlink data portion 536 and uplink control portion 539. For special uplink subframe 540, a GP1 543 is provided between downlink control portion 542 and uplink data portion 544, whereas a GP2 547 is provided between uplink data portion 544 and uplink control portion 548. Therefore, a GP2 may be provided to allow RF beam switching to be performed between subframe portions of a same link direction within a subframe.

Figure 6:
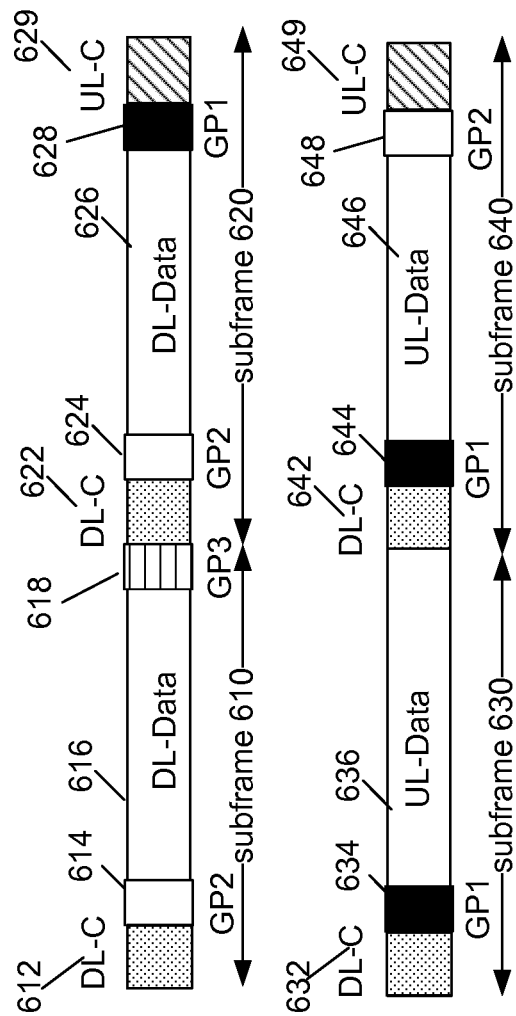
FIG. 6 is a diagram illustrating subframes including GP2 (guard period 2) between subframe portions of a same link direction within a subframe and GP3 (guard period 3) between subframe portions of a same link direction between subframes according to an example implementation.

FIG. 6 is a diagram illustrating subframes including GP2 (guard period 2) between subframe portions of a same link direction within a subframe and GP3 (guard period 3) between subframe portions of a same link direction between subframes. For subframe 610, a GP2 614 is provided between a downlink control portion 612 and a downlink data portion 616. A GP3 618 is provided at the end of subframe 610, between downlink data portion 616 of subframe 610 and downlink control portion 622 of subframe 620. Thus, the GP3 (e.g., GP3 618) is provided at a boundary between two subframes. For example, a GP3 may be provided either at the end of a first subframe (e.g., subframe 610) or at the beginning of a second subframe (e.g., subframe 620), according to an example implementation. A GP2 624 is provided between a downlink control portion 622 of subframe 620 and a downlink data portion 626 of subframe 620. Also, a GP1 628 is provided between a downlink data portion 626 of subframe 620 and an uplink control portion of subframe 620.

Also, as shown in FIG. 6, a GP1 634 within subframe 630 is provided between a downlink control portion 632 and an uplink data portion 636. Another GP1 644 within subframe 640 is provided between downlink control portion 642 and uplink data portion 646. Finally, a GP2 648 is provided between uplink data portion 646 and an uplink control portion 649. Further, it may be assumed that the transition from UL data portion 636 to DL control portion 642 is handled by means of a timing advance (TA).

Figure 7:
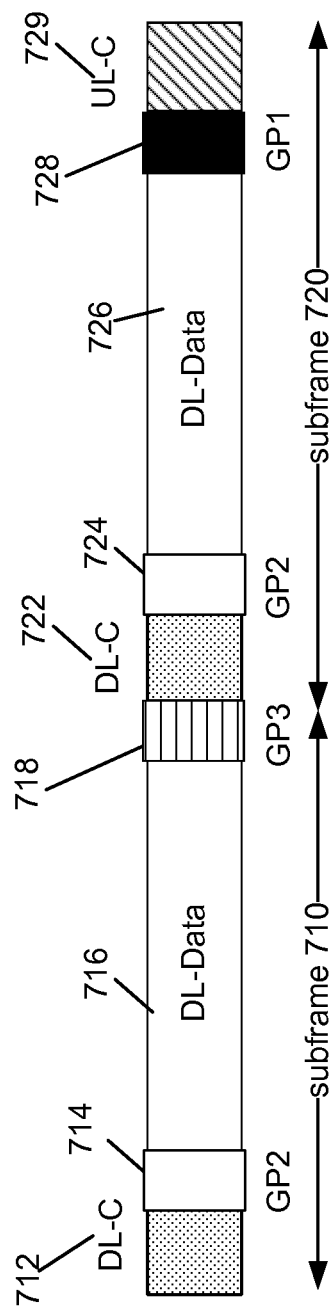
FIG. 7 is a diagram illustrating two subframes according to another example implementation.

FIG. 7 is a diagram illustrating two subframes according to another example implementation. For subframe 710, a GP2 714 is provided between a downlink control portion 712 and a downlink data portion 716. A GP3 718 is provided at the end of subframe 710. GP3 718 is provided between downlink data portion 716 of subframe 710 and downlink control portion 722 of subframe 720. A GP2 724 is provided between a downlink control portion 722 and a downlink data portion 726. Also, a GP1 728 is provided between a downlink data portion 726 and an uplink control portion 729.

A two-step process may be used, according to an example implementation. As the first step, the user device/UE receives information about applied cell specific GP configuration (indicating that GP2 and GP3 are applied) and the UE follows that configuration. FIG. 7 illustrates cell specific configuration of GP2 and GP3 that the user device/UE receives and applies, e.g., indicated by APBS via cell specific common control signaling. In the second step, dedicated downlink control signaling provides information for the user device/UE whether GP2 and/or GP3 are to be applied or not when receiving downlink data or transmitting uplink data in certain subframes. As discussed in the absence of cell-specific configuration, there can be also just the second step which indicates whether to have GP2 and/or GP3 in the transmission/reception of certain subframe(s). In some embodiments, presence of GP2/GP3 may be indicated also in different DCIs (Downlink Control Information). For example, UE may determine the need for GP3 in subframe n from presence of UL grant corresponding to (or allocating uplink resources in) subframe n+1.

Figure 8:
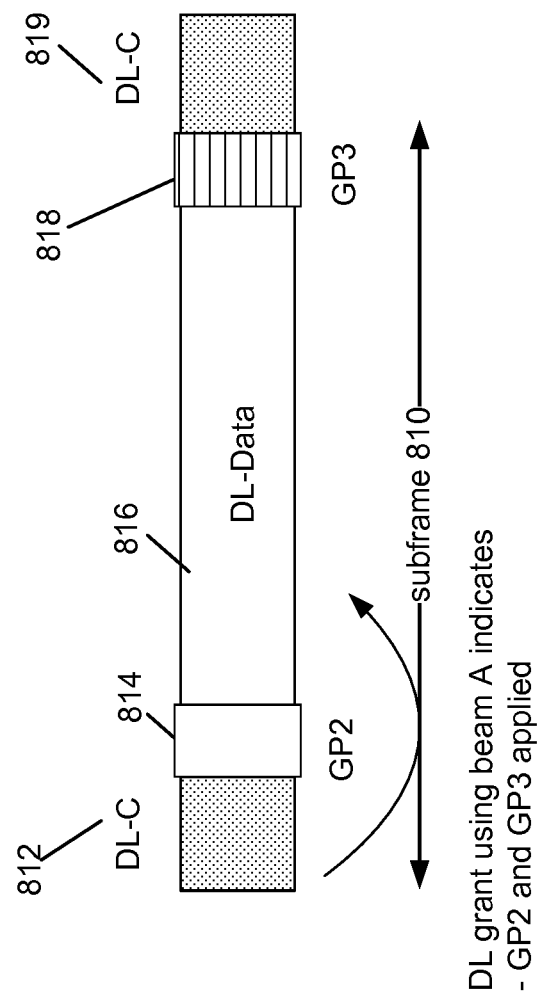
FIG. 8 is a diagram illustrating use of GP2 and GP3 according to another example implementation.

FIG. 8 is a diagram illustrating use of GP2 and GP3 according to another example implementation. For subframe 810, a GP2 814 is provided between downlink control portion 812 and a downlink data portion 816, and a GP3 818 is provided between a downlink data portion 816 of subframe 810 and a downlink control portion 819 of a next subframe. With respect to FIG. 8, a downlink grant from the APBS provided via downlink control portion 812 via beam A indicates that GP2 (e.g., GP2 814) and GP3 (e.g., GP3 818) are applied. Thus, FIG. 8 illustrates a downlink data transmission when data can be transmitted in the same subframe as allocation grant (DCI/downlink control information). For example, the APBS uses RF beam A for DCI (sent via downlink control information 812), but APBS uses AP beams A and B to transmit data at downlink data portion 816. Thus, to setup beam B for data portion 816, the APBS needs to perform beam switching of the transceiver unit to generate beam B after downlink control portion 812. Hence, the guard period configuration communicated to the user device/UE via DCI (or signaled or indicated by APBS via Dl grant) at downlink control portion 812 indicates that GP2 is to be provided/configured, and this guard period configuration may be signaled or indicated by APBS via the DL grant at downlink portion 812. Additionally, the BS will not use beams A and B for the following downlink control portion 819. Thus, the guard period configuration signaled at 812 also indicates that GP3 is also to be applied. Thus, the APBS performs beam switching during GP2 and GP3, and the user device/UE receives downlink data (at downlink data portion 816) and user device/UE assumes that GP2 814 and GP3 818 are present (e.g., based on the guard period configuration information provided via DCI or via the DL grant provided as part of the downlink control portion 812), according to an example implementation.

Figure 9:
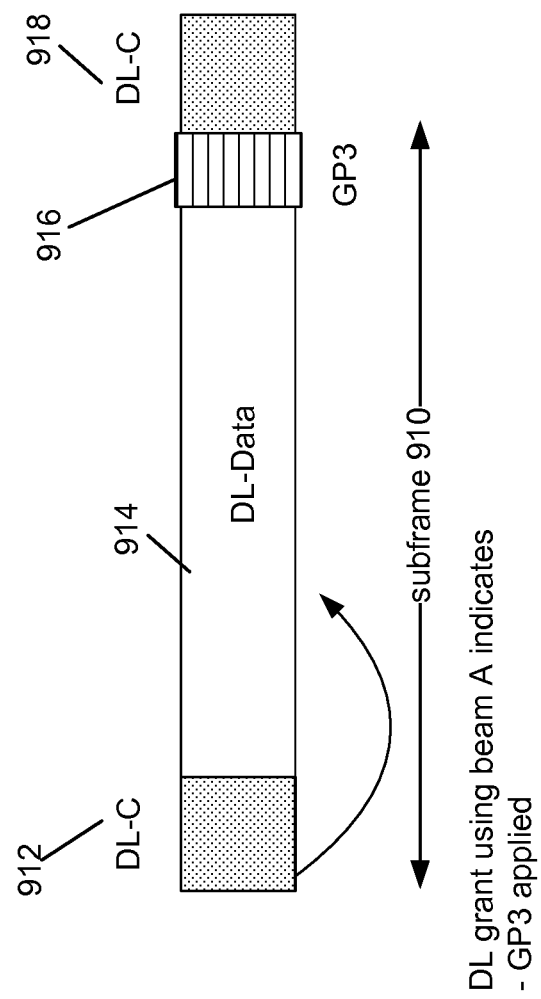
FIG. 9 is a diagram illustrating a subframe in which GP3 is provided according to another example implementation.

FIG. 9 is a diagram illustrating a subframe in which GP3 is provided according to another example implementation. For subframe 910, the APBS transmits the downlink control portion 912 via beam A, and then transmits the downlink data portion 914 via the same beam (beam A). Thus, in this illustrative example, because the APBS does not need to perform RF beam switching between portions 912 and 914 (rather APBS uses AP beam A to transmit both portions 912 and 914), the downlink grant sent by the APBS as part of the downlink control portion 914 includes guard period configuration indicating that only GP3 is provided and that GP2 is omitted (e.g., for this subframe). Thus, based on this guard period configuration information, GP3 916 is provided between downlink data portion of subframe 910 and a downlink control portion 918 of a next subframe, and GP2 is omitted/not provided for this (or the indicated) subframe(s). Hence, RF beam switching is performed during GP3 916, and the user device/UE received the downlink data portion 914 based on the assumption that no GP2 is provided (e.g., based on the guard period configuration provided in or with the downlink grant included in the downlink control portion 912). GP3 may be needed because the BS cannot use beam A for following downlink control block 918. In this example, 912 and 914 may be send to the same UE. However, 918 may be send to a different UE. Due to the fact that 918 is for a different UE, there may be a need to have GP3. One reason for indicating the presence of GP3 in 912 may be that GP3 916 may require e.g. puncturing of the last symbol of DL data block.

Figure 10:
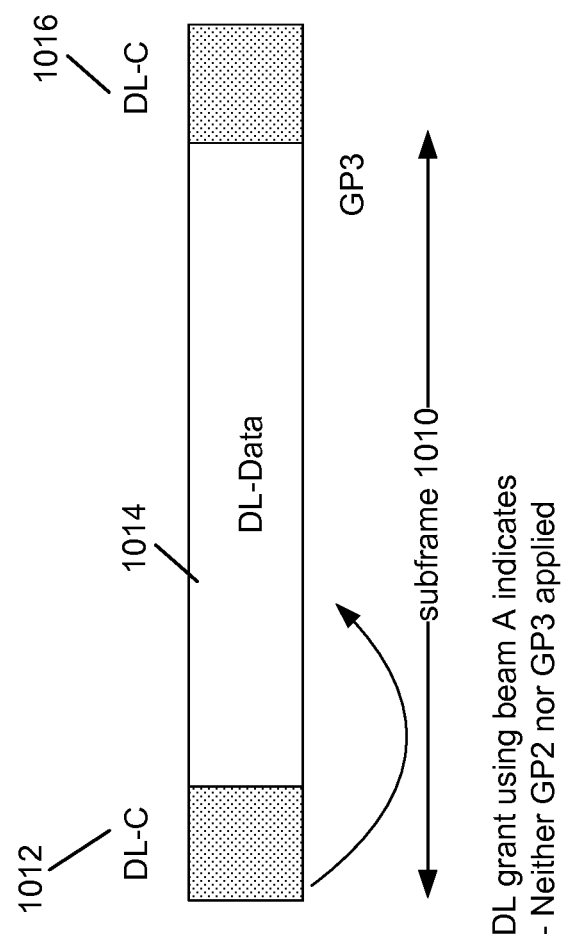
FIG. 10 is a diagram illustrating a subframe in which neither GP2 nor GP3 are provided according to an example implementation.

FIG. 10 is a diagram illustrating a subframe in which neither GP2 nor GP3 are provided according to an example implementation. In this example, for subframe 1010, the APBS transmits the downlink control portion 1012, the downlink data portion 1014 and the downlink data portion 1016 (of the next subframe) via beam A (same beam). Thus, the downlink control information (DCI) and/or the DL grant provided via the downlink control portion 1012 includes a guard period configuration for this subframe(s) indicating neither GP2 nor GP3 are provided/applied.

Figure 11:
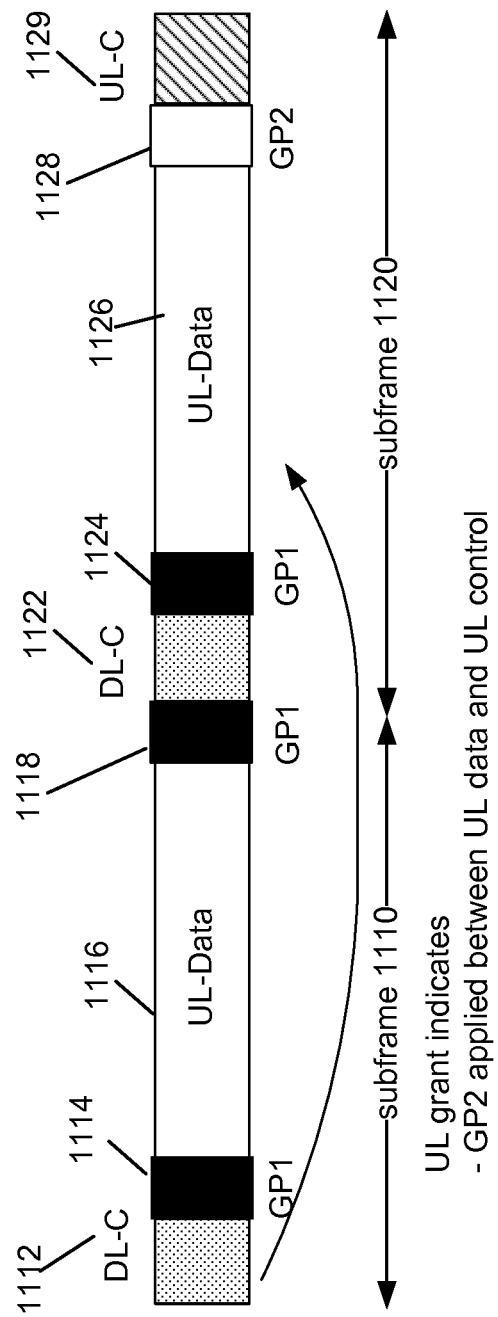
FIG. 11 is a diagram illustrating subframes in which a GP2 is provided according to an example implementation.

FIG. 11 is a diagram illustrating subframes in which a GP2 is provided according to an example implementation. In the subframes 1110 and 1120, GP3 is not applicable because the boundary subframe portions (on the boundary between subframes 1110 and 1120) are of different link direction. For subframe 1110, a GP1 is provided between a downlink control portion 1112 and an uplink data portion 1116, and another GP1 1118 is provided between uplink data portion 1116 and downlink control portion 1122 of subframe 1120. Also, another GP1 1124 is provided between downlink control portion 1122 and uplink data portion 1126. In this example, the APBS uses RF beam A to transmit downlink control information 1112 and beam A for receiving data via uplink data portion 1116. Also, the APBS will perform beam switching between uplink data portion 1126 and uplink control portion 1129. Therefore, in this example shown in FIG. 11, the APBS includes an uplink grant in the DCI of downlink control portion 1112, where the uplink grant (or other information included in the DCI) includes a guard period configuration indicating that GP2 (e.g., GP2 1128) is provided or applied, e.g., for the indicated subframe(s). The guard period configuration may also indicate that GP3 is not provided or applied for the indicated subframe(s). Thus, in this example, GP2 1128 is present, and the APBS performs beam switching during GP2 1128, and no GP3 is present.

Figure 12:
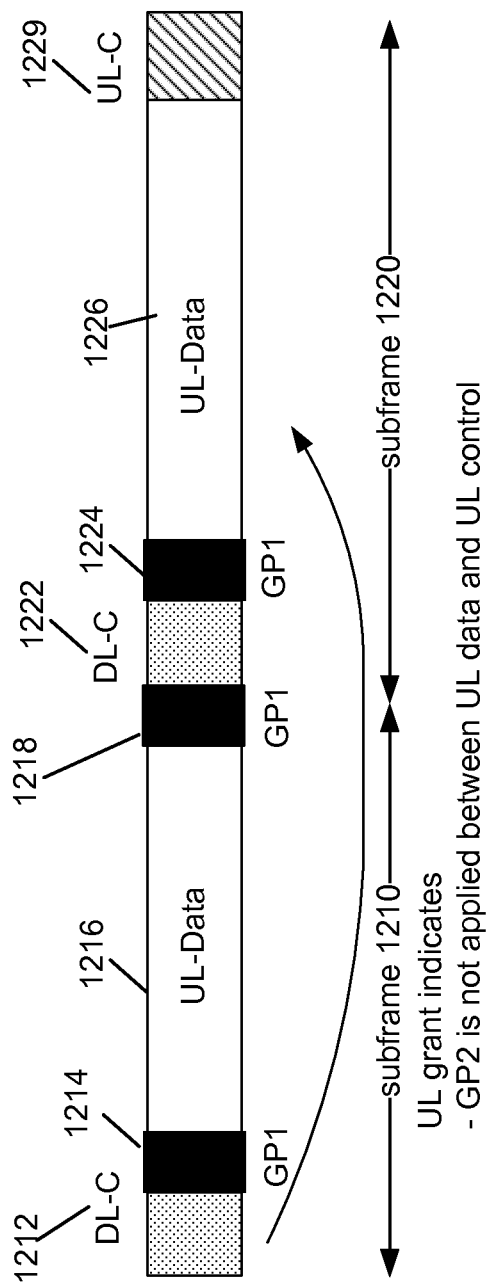
FIG. 12 is a diagram illustrating subframes in which GP2 is not provided according to an example implementation.

FIG. 12 is a diagram illustrating subframes in which GP2 is not provided according to an example implementation. In the subframes 1210 and 1220, GP3 is not applicable or provided because the boundary subframe portions (on the boundary between subframes 1210 and 1220) are of different link direction. In this example implementation, the AP uses beam A to transmit the uplink data portion 1226 and to transmit the uplink control portion 1229. Thus, no RF beam switching is required between portions 1226 and 1229, for example. Therefore, the UL grant provided by the AP in the DCI within downlink control portion 1212 (granting an uplink resource to the user device within uplink data portion 1226 of subframe 1220) indicates that GP2 is not provided/applied between uplink data portion 1226 and uplink control portion 1229 (e.g., because no beam switching by the AP is required between these subframe portions). A GP1 1214 is provided between downlink control portion 1212 and uplink data portion 1216. A GP1 1218 is provided between uplink data portion 1216 and downlink control portion 1222. And, a GP1 1224 is provided between downlink control portion 1222 and uplink data portion 1226.

Figure 13:
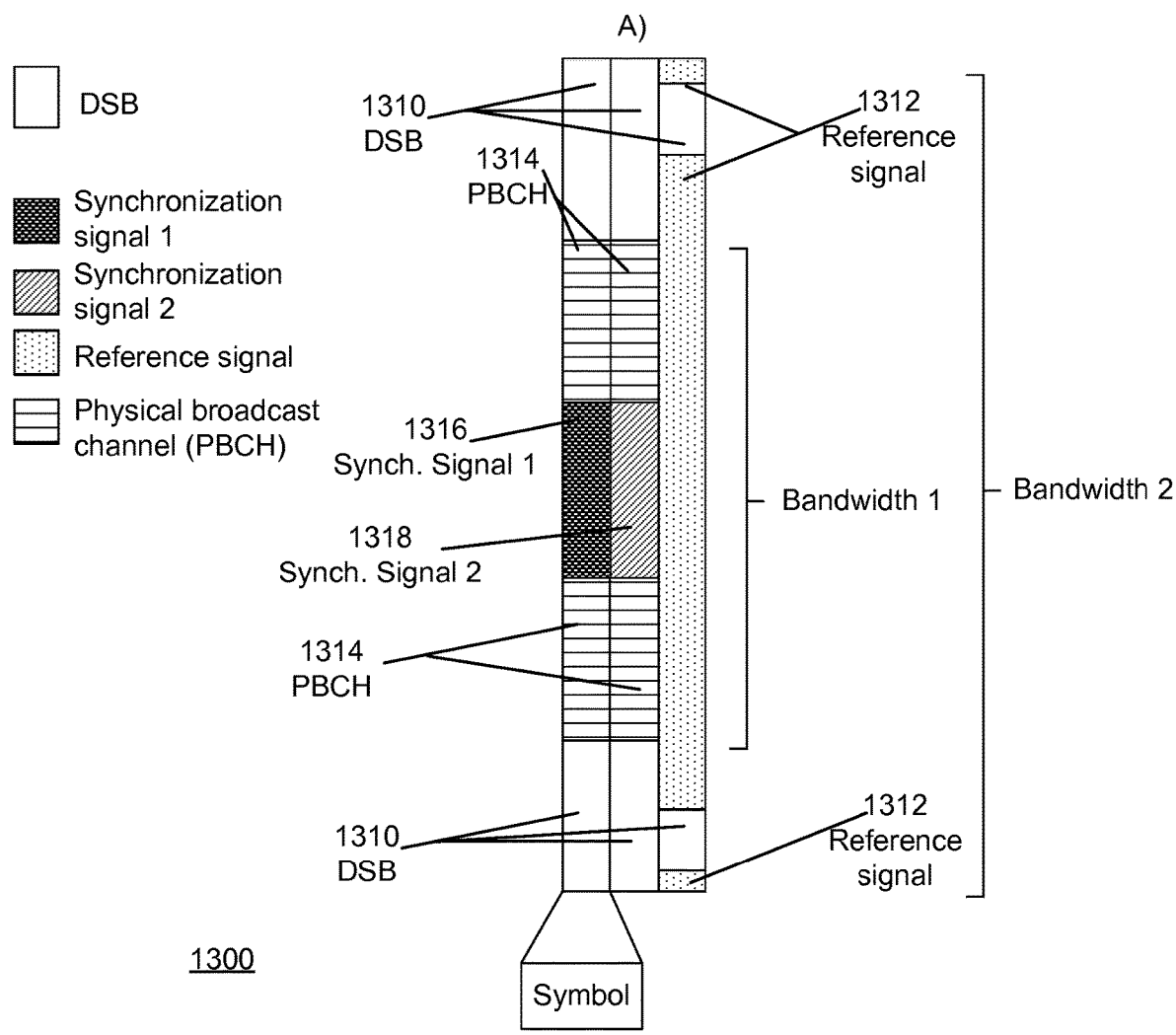
FIG. 13 is a diagram illustrating control signals in which a guard period configuration may be communicated according to an example implementation.

FIG. 13 is a diagram illustrating control signals in which a guard period configuration may be communicated according to an example implementation. The control signaling 1300 may include a discovery signal block 1310, a reference signal 1312, a physical broadcast channel (PBCH) 1314, a synchronization signal 1 1316, and a synchronization signal 2 1318. In one embodiment, the DSB 1310 comprises at least one of the reference signal 1312, the physical broadcast channel (PBCH) 1314, the synchronization signal 1 1316, and the synchronization signal 2 1318. The DSB may cover, e.g., one, two or three symbols (FIG. 13 illustrates the example case with three symbols). In one implementation example, a discovery signal block (DSB) 1310 is defined to convey periodical common control signaling. The DSB 1310 provides all the essential common control information for UEs to be able detect and access the cell. According to an example implementation, DSB structure (size in time and frequency domain, physical signals and channels) is considered to be the same independent of the transceiver architecture (digital or hybrid) and applied guard period configuration. One or multiple parallel beams can transmit DSB at a time and DSB blocks may be aggregated in time domain to provide support for sweeping of common control signaling typically required with hybrid architecture. If there are multiple guard period value pairs, PBCH 1314 of DSB 1310 may be used to convey the information. If there is only one non-zero GP2 and GP3 value pair (i.e., one configuration for hybrid architecture), information could be conveyed implicitly by using predefined properties of the DSB. For example, DSB 1310 may include two synchronization signals 1316 and 1318, and their relative location may indicate whether or not GP2 and GP3 are applied (digital or hybrid). In the example DSB block, when BS operates without need for GP2 and GP3, synchronization signals may be transmitted in consecutive symbols while when BS operates using GP2 (only one value), synchronization signals may be transmitted with one symbol between in time domain. Thus, according to an example implementation, the relative location of the synchronization signals 1316, 1318 (e.g., adjacent to each other, or with a symbol in-between) may indicate a presence of GP2/GP3 or not.

Table 1 below illustrates some example parameters for digital and hybrid architectures for downlink only and Special downlink subframes according to an example implementation. GP2 and/or GP3 are typically not necessary for a BS/AP with a digital architecture. Thus, the ability to signal a guard period configuration for a subframe(s), e.g., indicating whether or not GP2/GP3 are provided for specific subframes may allow both hybrid and digital architectures to be accommodated. GP2 and GP3 may be of the same length. In another embodiment, the lengths of GP2/GP3 may vary, e.g., due to GP3 being used to adjust the total length of the subframe. In general, the length of the GP2 and/or GP3 may depend on parameters including architecture, array size, carrier frequency, scenario and transmission power.

TABLE 1

| Subframe type | DL-only | | | | S-DL | | | |
|---|---|---|---|---|---|---|---|---|
| BS Architecture | Digital | | Hybrid | | Digital | | Hybrid | |
| Subcarrier spacing [kHz] | 120 | | 120 | | 120 | | 120 | |
| Symbol length [us] | 8,335 | | 8,335 | | 8,335 | | 8,335 | |
| Subframe length [us] | 125 | | 125 | | 125 | | 125 | |
| GP [us] | 4.7 | 2 | 4.7 | 2 | 4.7 | 2 | 4.7 | 2 |
| GP2 [us] | — | | 2.3 | 0.1 | — | | 2.3 | 0.1 |
| Cyclic prefix [us] | 0.6 | | 0.6 | | 0.6 | | 0.6 | |
| #symbols per subframe | 14 | 14 | 13 | 13 | 13 | 13 | 12 | 13 |

Figure 14:
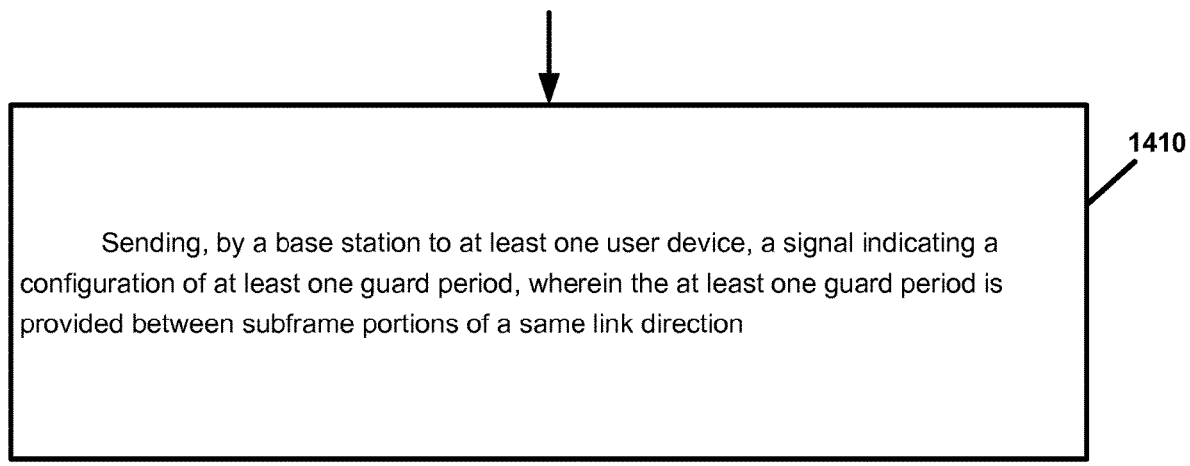
FIG. 14 is a flow chart illustrating operation of a base station/access point according to an example implementation.

FIG. 14 is a flow chart illustrating operation of a base station/access point according to an example implementation. Operation 1410 includes sending, by a base station to at least one user device, a signal indicating a configuration of at least one guard period, wherein the at least one guard period is provided between subframe portions of a same link direction.

According to an example implementation of the method of FIG. 14, the configuration may include at least one of: a subframe configuration that indicates at least one guard period, provided between subframe portions of a same link direction, for one or more subframes; and a guard period configuration that indicates at least one guard period, provided between subframe portions of a same link direction, for one or more subframes.

According to an example implementation of the method of FIG. 14, wherein the at least one guard period may include: a guard period provided between a control subframe portion and a data subframe portion of a same link direction.

According to an example implementation of the method of FIG. 14, wherein the at least one guard period may include: a guard period provided between subframe portions of a same link direction within a subframe.

According to an example implementation of the method of FIG. 14, wherein the at least one guard period includes: a guard period provided between subframe portions of a same link direction of different subframes.

According to an example implementation of the method of FIG. 14, wherein the at least one guard period includes: at least one first guard period provided between subframe portions of a same link direction within a subframe; and at least one second guard period provided between subframe portions of a same link direction of different subframes.

According to an example implementation of the method of FIG. 14, and further including performing, by the base station, beam switching during the at least one guard period.

According to an example implementation of the method of FIG. 14, wherein the sending includes: sending, by a base station to at least one user device, a cell specific signaling indicating that the at least one guard period is or is not provided between subframe portions of a same link direction; and wherein the method further includes sending, by the base station to at least one user device, user device-specific signaling indicating that the at least one guard period will not be or will be, respectively, provided for one or more specific subframes.

According to an example implementation of the method of FIG. 14, and further including sending, by the base station to at least one user device, signaling indicating whether or not the at least one guard period will be provided for one or more specific subframes.

According to an example implementation of the method of FIG. 14, and further including determining, by the base station, that the base station will not perform beam switching between a first subframe portion and a second subframe portion of a same link direction; and sending, by the base station to at least one user device, signaling indicating that the at least one guard period will not be provided between the first subframe portion and the second subframe portion of a same link direction.

According to an example implementation of the method of FIG. 14, wherein one or more symbols of the at least one guard period are provided or obtained by the base station performing one or more of the following: puncturing one or more data symbols of a subframe; puncturing one or more symbols of a cyclic prefix of a subframe; shortening a guard period provided between subframe portions of a different link direction; and increasing one or more symbols of a zero tail of a subframe.

According to an example implementation of the method of FIG. 14, and further including: providing an indication in a subframe, by the base station to the at least one user device, that the at least one guard period is provided in the subframe in which the indication is provided.

According to an example implementation of the method of FIG. 14, wherein the sending includes sending, by a base station to a user device, signaling including an uplink grant to the user device that grants an uplink resource to the user device to perform an uplink transmission during a subframe, the signaling indicating that at least one guard period, provided between subframe portions of a same link direction, will be provided in the subframe in which an uplink transmission is performed by the user device via the granted uplink resource.

According to an example implementation, an apparatus includes at least one processor and at least one memory including computer instructions, when executed by the at least one processor, cause the apparatus to: send, by a base station to at least one user device, a signal indicating a configuration of at least one guard period, wherein the at least one guard period is provided between subframe portions of a same link direction.

According to another example implementation, a computer program product includes a computer-readable storage medium and storing executable code that, when executed by at least one data processing apparatus, is configured to cause the at least one data processing apparatus to: send, by a base station to at least one user device, a signal indicating a configuration of at least one guard period, wherein the at least one guard period is provided between subframe portions of a same link direction.

According to another example implementation, an apparatus includes: means (e.g., 1602A/1602B and/or 1604, FIG. 16) for sending, by a base station to at least one user device, a signal indicating a configuration of at least one guard period, wherein the at least one guard period is provided between subframe portions of a same link direction; and means (e.g., 1602A/1602B and/or 1604, FIG. 16) for sending, by the base station to at least one user device, signaling indicating whether or not the at least one guard period will be provided for one or more specific subframes.

Figure 15:
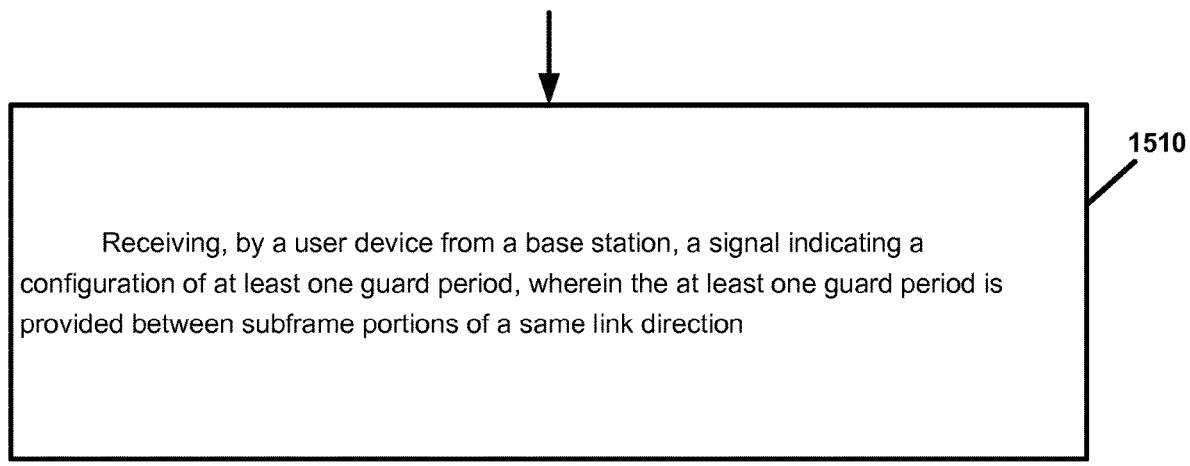
FIG. 15 is a flow chart illustrating operation of a user device according to an example implementation.

FIG. 15 is a flow chart illustrating operation of a user device according to an example implementation. Operation 1510 includes receiving, by a user device from a base station, a signal indicating a configuration of at least one guard period, wherein the at least one guard period is provided between subframe portions of a same link direction.

According to an example implementation of the method of FIG. 15, wherein the at least one guard period includes: a guard period provided between subframe portions of a same link direction within a subframe.

According to an example implementation of the method of FIG. 15, the at least one guard period includes: a guard period provided between subframe portions of a same link direction of different subframes.

According to an example implementation of the method of FIG. 15, the at least one guard period includes: at least one first guard period provided between subframe portions of a same link direction within a subframe; and at least one second guard period provided between subframe portions of a same link direction of different subframes.

According to an example implementation of the method of FIG. 15, and further including performing, by the user device, beam switching during the at least one guard period.

According to an example implementation of the method of FIG. 15, and further including receiving, by the user device from the base station, signaling indicating whether or not the at least one guard period will be provided for one or more specific subframes.

According to an example implementation of the method of FIG. 15, and further including receiving an indication in a subframe, by the user device from the base station, that the at least one guard period is provided in the subframe in which the indication is provided.

According to an example implementation of the method of FIG. 15, wherein the receiving includes receiving, by the user device from the base station, signaling including an uplink grant to the user device that grants an uplink resource to the user device to perform an uplink transmission during a subframe, the signaling indicating that at least one guard period, provided between subframe portions of a same link direction, will be provided in the subframe in which an uplink transmission is performed by the user device via the granted uplink resource.

According to an example implementation, an apparatus may include: means (e.g., 1602A/1602B and/or 1604, FIG. 16) for receiving, by a user device from a base station, a signal indicating a configuration of at least one guard period, wherein the at least one guard period is provided between subframe portions of a same link direction; and means (e.g., 1602A/1602B and/or 1604, FIG. 16) for receiving, by the user device from the base station, signaling indicating whether or not the at least one guard period will be provided for one or more specific subframes.

An apparatus comprising at least one processor and at least one memory including computer instructions, when executed by the at least one processor, cause the apparatus to perform the method of receiving, by a user device from a base station, a signal indicating a configuration of at least one guard period, wherein the at least one guard period is provided between subframe portions of a same link direction.

A computer program product, the computer program product comprising a computer-readable storage medium and storing executable code that, when executed by at least one data processing apparatus, is configured to cause the at least one data processing apparatus to perform a method of receiving, by a user device from a base station, a signal indicating a configuration of at least one guard period, wherein the at least one guard period is provided between subframe portions of a same link direction.

Figure 16:
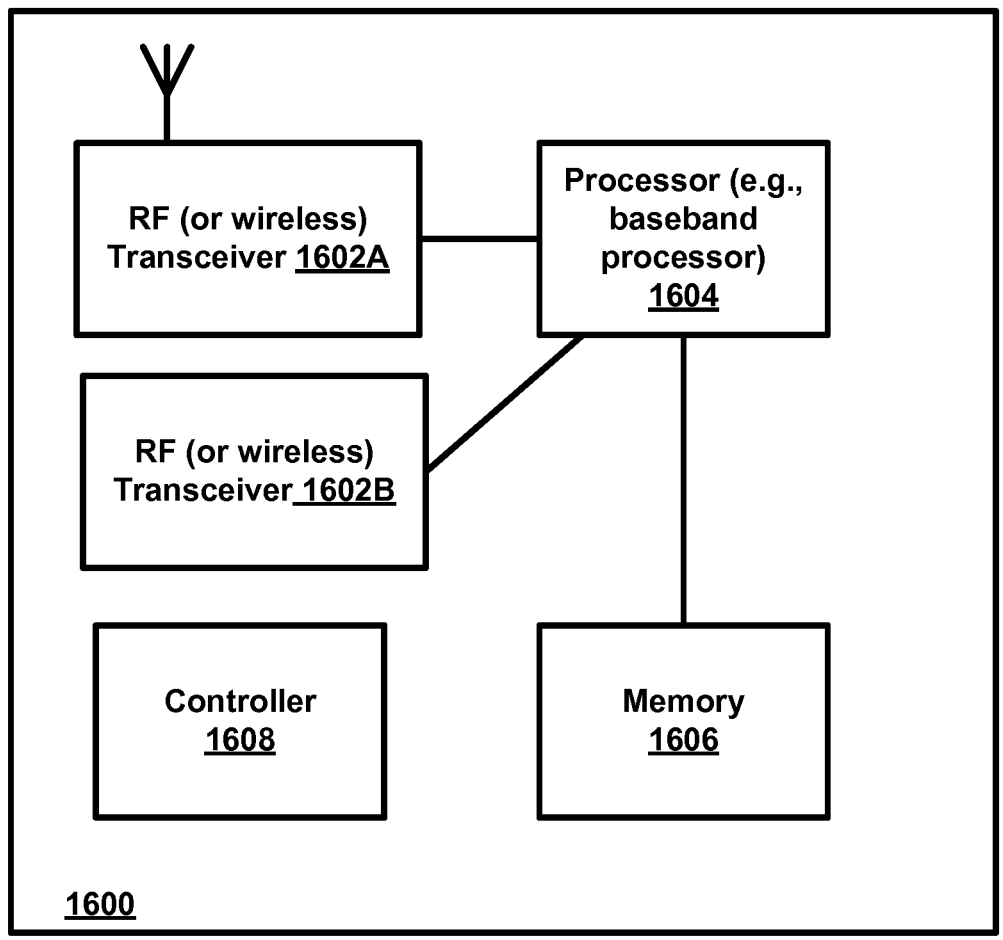
FIG. 16 is a block diagram of a wireless station (e.g., base station/access point or mobile station/user device) according to an example implementation.

FIG. 16 is a block diagram of a wireless station (e.g., AP or user device) 1600 according to an example implementation. The wireless station 1600 may include, for example, one or two RF (radio frequency) or wireless transceivers 1602A, 1602B, where each wireless transceiver includes a transmitter to transmit signals and a receiver to receive signals. The wireless station also includes a processor or control unit/entity (controller) 1604 to execute instructions or software and control transmission and receptions of signals, and a memory 1606 to store data and/or instructions.

Processor 1604 may also make decisions or determinations, generate frames, packets or messages for transmission, decode received frames or messages for further processing, and other tasks or functions described herein. Processor 1604, which may be a baseband processor, for example, may generate messages, packets, frames or other signals for transmission via wireless transceiver 1602 (1602A or 1602B). Processor 1604 may control transmission of signals or messages over a wireless network, and may control the reception of signals or messages, etc., via a wireless network (e.g., after being down-converted by wireless transceiver 1602, for example). Processor 1604 may be programmable and capable of executing software or other instructions stored in memory or on other computer media to perform the various tasks and functions described above, such as one or more of the tasks or methods described above. Processor 1604 may be (or may include), for example, hardware, programmable logic, a programmable processor that executes software or firmware, and/or any combination of these. Using other terminology, processor 1604 and transceiver 1602 together may be considered as a wireless transmitter/receiver system, for example.

In addition, referring to FIG. 16, a controller (or processor) 1608 may execute software and instructions, and may provide overall control for the station 800, and may provide control for other systems not shown in FIG. 16, such as controlling input/output devices (e.g., display, keypad), and/or may execute software for one or more applications that may be provided on wireless station 1600, such as, for example, an email program, audio/video applications, a word processor, a Voice over IP application, or other application or software.

In addition, a storage medium may be provided that includes stored instructions, which when executed by a controller or processor may result in the processor 1604, or other controller or processor, performing one or more of the functions or tasks described above.

According to another example implementation, RF or wireless transceiver(s) 1602A/1602B may receive signals or data and/or transmit or send signals or data. Processor 1604 (and possibly transceivers 1602A/1602B) may control the RF or wireless transceiver 1602A or 1602B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
sending, by a base station to at least one user device, a signal indicating a configuration of at least one guard period for beam switching, wherein the at least one guard period is provided between subframe portions of a same link direction,
wherein the sending comprises sending, by a base station to at least one user device, a cell specific signaling indicating that the at least one guard period is or is not provided between subframe portions of a same link direction.

2. The method of claim 1 wherein the configuration comprises at least one of:
a subframe configuration that indicates at least one guard period, provided between subframe portions of a same link direction, for one or more subframes; and
a guard period configuration that indicates at least one guard period, provided between subframe portions of a same link direction, for one or more subframes.

3. The method of claim 1 wherein the at least one guard period comprises:
a guard period provided between a control subframe portion and a data subframe portion of a same link direction.

4. The method of claim 1 wherein the at least one guard period comprises at least one of:
a guard period provided between subframe portions of a same link direction within a subframe; and
a guard period provided between subframe portions of a same link direction of different subframes.

5. The method of claim 1 wherein the at least one guard period comprises:
at least one first guard period provided between subframe portions of a same link direction within a subframe; and
at least one second guard period provided between subframe portions of a same link direction of different subframes.

6. The method of claim 1 and further comprising:
performing, by the base station, beam switching during the at least one guard period.

7. The method of claim 1
wherein the method further comprises sending, by the base station to at least one user device, user device-specific signaling indicating that the at least one guard period will not be or will be, respectively, provided for one or more specific subframes.

8. The method of claim 1 and further comprising:
determining, by the base station, that the base station will not perform beam switching between a first subframe portion and a second subframe portion of a same link direction; and
sending, by the base station to at least one user device, signaling indicating that the at least one guard period will not be provided between the first subframe portion and the second subframe portion of a same link direction.

9. The method of claim 1 wherein one or more symbols of the at least one guard period are provided or obtained by the base station performing one or more of the following:
puncturing one or more data symbols of a subframe;
puncturing one or more symbols of a cyclic prefix of a subframe;
shortening a guard period provided between subframe portions of a different link direction; and
increasing one or more symbols of a zero tail of a subframe.

10. The method of claim 1 and further comprising:
providing an indication in a subframe, by the base station to the at least one user device, that the at least one guard period is provided in the subframe in which the indication is provided.

11. The method of claim 1 wherein the sending comprises:
sending, by a base station to a user device, signaling including an uplink grant to the user device that grants an uplink resource to the user device to perform an uplink transmission during a subframe, the signaling indicating that at least one guard period, provided between subframe portions of a same link direction, will be provided in the subframe in which an uplink transmission is performed by the user device via the granted uplink resource.

12. An apparatus comprising at least one processor and at least one memory including computer instructions, when executed by the at least one processor, cause the apparatus to:
send, by a base station to at least one user device, a signal indicating a configuration of at least one guard period for beam switching, wherein the at least one guard period is provided between subframe portions of a same link direction,
wherein the computer instructions that cause the apparatus to send the signal further cause the apparatus to send, by the base station to the at least one user device, a cell specific signaling indicating that the at least one guard period is or is not provided between subframe portions of a same link direction.

13. A computer program product, the computer program product comprising a non-transitory computer-readable storage medium and storing executable code that, when executed by at least one data processing apparatus, is configured to cause the at least one data processing apparatus to perform the method of claim 1.

14. A method comprising:
receiving, by a user device from a base station, a signal indicating a configuration of at least one guard period wherein the at least one guard period is for beam switching between a control signaling and data signaling, and, wherein the at least one guard period is provided between a control subframe portion and a data subframe portion of a same link direction; and receiving, by the user device from the base station, signaling indicating whether or not the at least one guard period for beam switching is provided for one or more specific subframes.

15. The method of claim 14 wherein the at least one guard period comprises at least one of:
- a guard period provided between subframe portions of a same link direction within a subframe; and
- a guard period provided between subframe portions of a same link direction of different subframes.

16. The method of claim 14 wherein the at least one guard period comprises:
- at least one first guard period provided between subframe portions of a same link direction within a subframe; and
- at least one second guard period provided between subframe portions of a same link direction of different subframes.

17. The method of claim 14 and further comprising:
performing, by the user device, beam switching during the at least one guard period.

18. The method of claim 14 and further comprising:
receiving an indication in a subframe, by the user device from the base station, that the at least one guard period is provided in the subframe in which the indication is provided.

19. The method of claim 14 wherein the receiving comprises:
receiving, by the user device from the base station, signaling including an uplink grant to the user device that grants an uplink resource to the user device to perform an uplink transmission during a subframe, the signaling indicating that at least one guard period, provided between subframe portions of a same link direction, will be provided in the subframe in which an uplink transmission is performed by the user device via the granted uplink resource.

20. A computer program product, the computer program product comprising a non-transitory computer-readable storage medium and storing executable code that, when executed by at least one data processing apparatus, is configured to cause the at least one data processing apparatus to perform a method of claim 14.

21. A method comprising:
receiving, by a user device from a base station, a signal indicating a configuration of at least one guard period for beam switching, wherein the at least one guard period is provided between portions of a subframe for transmission in a same link direction; and receiving, by the user device from the base station, signaling indicating whether or not the at least one guard period for beam switching is provided for one or more specific subframes.

22. An apparatus, comprising:
at least one processor; and
at least one memory including computer program code;
the at least one memory and the computer program code configured to cause the apparatus at least to:
- receive, from a base station, a signal indicating a configuration of at least one guard period for beam switching, wherein the at least one guard period is provided between portions of a subframe for transmission in a same link direction; and
- receive, by the user device from the base station, signaling indicating whether or not the at least one guard period for beam switching is provided for one or more specific subframes.

* * * * *